E. H. BRISTOL.
MEASURING AND CONTROLLING MECHANISM.
APPLICATION FILED OCT. 19, 1917.
1,326,640.
Patented Dec. 30, 1919.
2 SHEETS—SHEET 1.
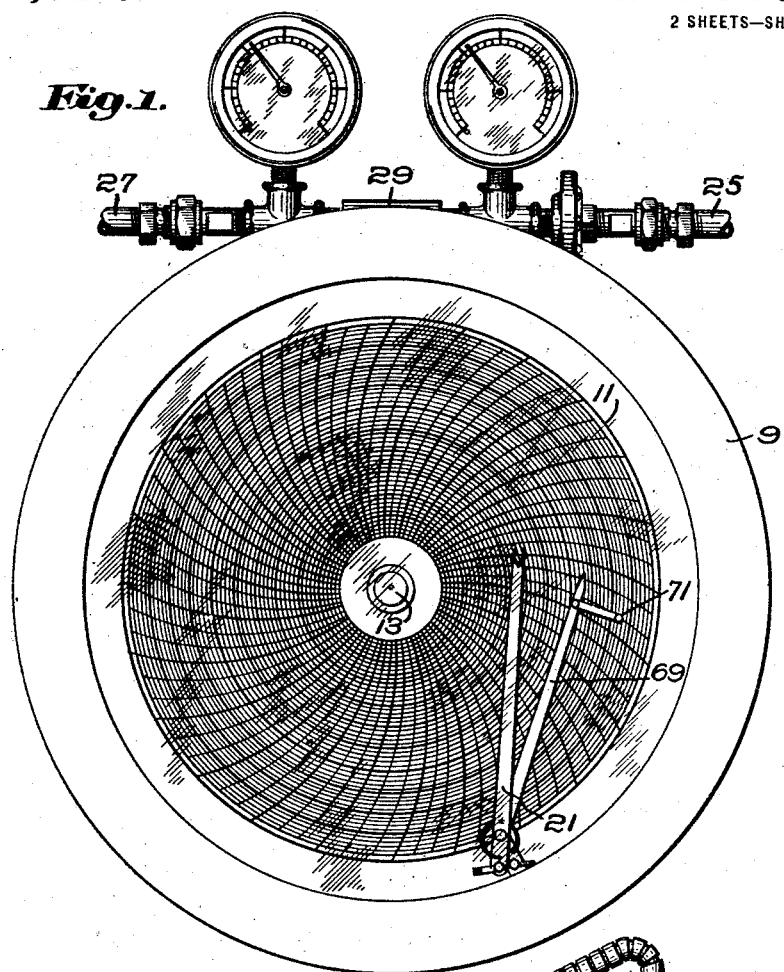
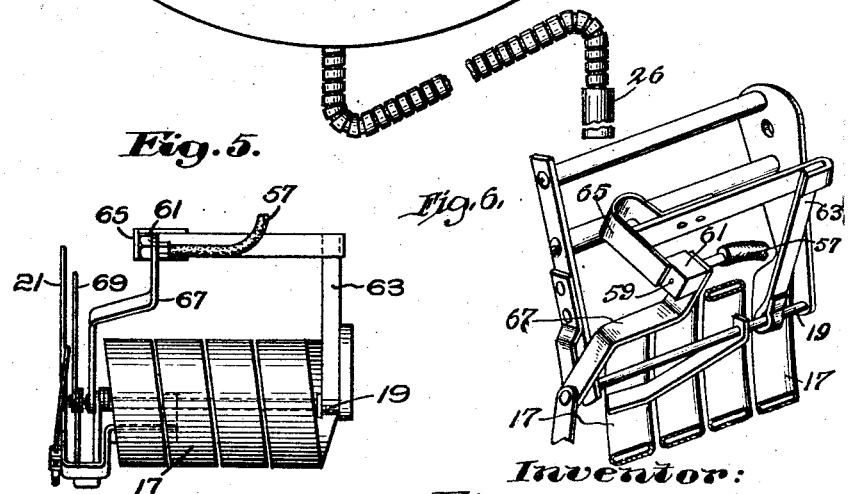
Inventor:
Edgar H. Bristol.

E. H. BRISTOL.
MEASURING AND CONTROLLING MECHANISM.
APPLICATION FILED OCT. 19, 1917.

1,326,640.

Patented Dec. 30, 1919.
2 SHEETS—SHEET 2.

Inventor:
Edgar H. Bristol.
by Emery, Booth, Janney & Varney
Attys.

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING AND CONTROLLING MECHANISM.

1,326,640. Specification of Letters Patent. Patented Dec. 30, 1919.

Application filed October 19, 1917. Serial No. 197,436.

*To all whom it may concern:*

Be it known that I, EDGAR H. BRISTOL, a citizen of the United States, and resident of Foxboro, in the county of Norfolk and State of Massachusetts, have invented an Improvement in Measuring and Controlling Mechanism, of which the following description, in connection with the accompanying drawing, is a specification, like characters on the drawings representing like parts.

This invention relates to combined measuring and controlling mechanism. In particular, my purpose is to provide an instrument which will measure and indicate or record conditions at a certain point, which conditions may, for example, be of pressure or of temperature, and which instrument will also control the passage of fluid through a conduit, which fluid may either directly affect the conditions being measured or control the same through intermediate mechanisms. For definiteness I have chosen by way of an example of my invention an instrument adapted to measure temperature conditions and, in particular, one measuring temperature by the pressure effects thereof on a suitable pressure sensitive device, and to record these conditions on a suitable dial. An instrument performing these functions alone is commonly known as a recording thermometer. The present device is also a controlling instrument and controls the passage of fluid through a conduit, the fluid in the example chosen being under positive pressure.

My invention will be best understood by reference to the following detailed description of the embodiment thereof referred to which is illustrated in the accompanying drawings wherein:—

Figure 1 is the front elevation of the instrument;

Fig. 5 is a side elevation of the pressure sensitive, measuring device embodied in the instrument and viewed from the right in Fig. 2; and Fig. 6 is a broken perspective view of the pressure sensitive device and associated mechanism.

Figure 2:
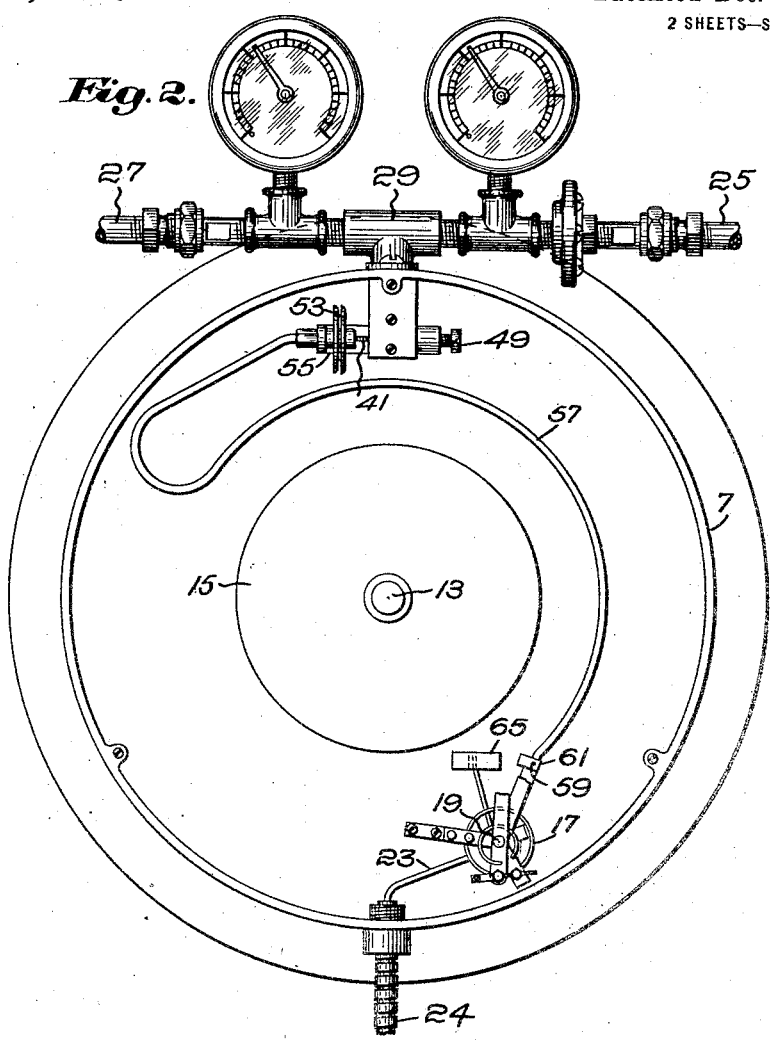
Fig. 2 is a similar view of the same with the door and front face removed to show the interior; the hands or pointers which appear in Fig. 1 are broken away in this figure.

Referring to Figs. 1 and 2, the instrument shown embodies a suitable case 7 (Fig. 2) the front of which may be covered by a glazed door 9 (Fig. 1) through which is displayed the dial of the instrument, here shown as the usual removable polar chart 11 adapted to be rotated by the shaft 13 of a suitable time train not herein shown in detail but of which the inclosing casing 15 appears in Fig. 2. The measuring element herein takes the form of a pressure sensitive device, although other suitable forms of responsive elements can be used. Herein I have shown a flat helical tube 17 (see Figs. 2 and 5) supported at one end and secured at its other end to a shaft 19 to which is connected the index or pen 21 which sweeps over the chart 11, marking the same in well known manner. The tube 17 may be connected by a capillary pipe 23, conveniently protected by armor 24 at the exterior of the casing, with a bulb 26 adapted to be exposed to temperature conditions at the point where it is desired to measure them. It will be understood that the bulb 26, pipe 23 and tube 17 may be filled with fluid such as alcohol and that the changes of vapor tension caused by changes of temperature will act to distort the tube 17 and actuate the index 21.

The instrument here shown is adapted to control the passage of fluid under pressure from the pipe 25 to the pipe 27. In other words, in the embodiment of the invention illustrated the flow of fluid which is controlled is from right to left viewing the drawings. It will be understood that the fluid flow may be utilized to control other mechanisms.

Figure 3:
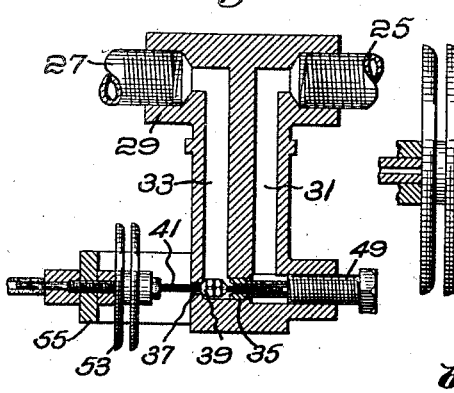
Fig. 3 is a view on an enlarged scale and in vertical section of a fitting of the pressure conduit and some of the controlling mechanism therefor.

Herein communication is provided between pipes 25 and 27 by a fitting or union 29 secured to and extending into the instrument case. As best seen in Fig. 3, the fitting 29 provides a connection between pipes 25 and 27, including parallel passages 31 and 33 and a connecting passage 35. The flow of fluid through these passages is controlled by valve mechanism shown in Figs. 3 and 4 and which I shall next describe.

Figure 4:
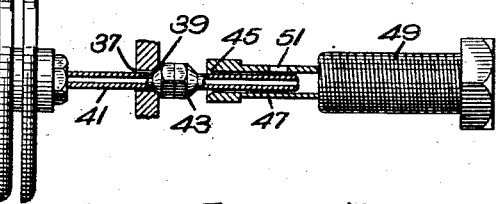
Fig. 4 is a view on a still larger scale and with parts broken away of details of Fig. 3.

In the passage 33 a port 37 is provided leading to the outer atmosphere within the casing 7, and this port is adapted to be sealed by a valve 39 carried by the tubular valve rod 41. Also carried by this valve rod is a valve 43 adapted, when the valve 39 is withdrawn to the right away from its seat, to seat on a valve seat 45 herein shown as formed in the end of a sleeve 47 carried by a screw plug 49 and fitting the connecting passage 35. This sleeve also forms a guide for the valve carrying rod 41 as best seen in Fig. 4, the rod, however, fitting loosely therein to permit the passage of pressure fluid around the same from passage 31 through the opening or port 51 in the side of sleeve 47.

The hollow valve rod 41 is carried by and communicates with an expansible diaphragm 53 herein shown as supported by a bracket 55 extending from fitting 29. The parts are so designed that when the diaphragm 53 is in its normal condition it is under mechanical tension, the valve 39 is held seated and communication is open between pipes 25 and 27. As pressure fluid flows through the fitting 29, a certain amount will enter the hollow valve rod 41 at the right hand end, viewing Figs. 3 and 4, and is permitted to escape or bleed therethrough, through the diaphragm 53 and (see Fig. 2) through flexible connecting tube 57 and through an exhaust port 59 in a terminal member 61 to the atmosphere within the interior of casing 7. It will be understood that the passage through the valve rod 41 is so minute that the escape of pressure fluid does not materially affect the flow.

When it is desired to interrupt the flow of pressure fluid through the pipes 25 and 27, the exhaust port 59 may be closed by means hereinafter to be described. The escape of pressure fluid through the valve carrying rod 41 will then expand diaphragm 53, shifting the rod and seating valve 43 against its seat 45, thus cutting off the passage 35 from the passage 31, interrupting the flow of pressure fluid to pipe 27, and permitting the fluid in pipe 25 to exhaust to the atmosphere through port 37. The mechanism just described is substantially similar to that shown and described in my application, Serial No. 873,573, filed Nov. 23, 1914.

I shall next describe the means herein utilized for controlling the motor diaphragm 53 and hence the valves 39 and 43. In the present embodiment of the invention the measuring tube 17 which measures the temperature is also used as a controlling device and provides for interrupting the flow of pressure fluid through pipes 25 and 27 when the temperature surrounding bulb 26 is at any desired point for which the instrument has been set. Referring to Fig. 2, it will be noted that the terminal member 61 with its exhaust port 59 communicating with diaphragm 53 is located adjacent the tube 17 and a valve is provided, controlled by the tube 17, for closing the exhaust port 59 and thus causing the operation of valves 39 and 43 by the diaphragm. Herein the index shaft 19, which is turned by the tube 17 as the temperature varies, is provided with a crank arm 63 which carries a laterally extending spring strip 65 adapted to slide over the face of terminal member 61 and cover over exhaust port 59. It will be apparent that if the parts are in the position shown in Fig. 2 and the temperature rises so as to cause rotation of shaft 19 in a clockwise direction, the strip 65 will gradually be moved to the right until it passes over the face of member 61 (see Fig. 5) and closes off the port 59, (Fig. 2) thereby causing the diaphragm 53 to operate.

To permit variation of the point at which this controlling action takes place, means are provided for varying the position of terminal member 61 and the exhaust port 59 relative to the coöperating valve 65. Herein I have shown the member 61 as mounted on an arm 67, loose on shaft 19 and connected to a pointer 69 pivoted to swing about the same axial line as the hand 21 and extending in the same general direction as the latter over the dial face of the instrument. For convenience the pointer 69 may be provided with a handle 71. The pointer 69 may be manipulated in connection with the scale on the chart 11 and the exhaust port 59 thereby brought into desired position of adjustment relative to its valve 65 to cause operation of the controlling mechanism at the proper moment. Conveniently the arrangement is such that when the longitudinal axes of the hand 21 and pointer 69 are superimposed, the port 59 will be closed. Thus it will only be necessary to set the pointer 69 at the temperature on the chart at which it is desired to interrupt the flow of fluid through pipes 25 and 27 and when the temperature has reached that point the flow of fluid will automatically be interrupted. If the temperature thereafter falls, the valve 65 will be removed from its coöperating ported element 61 and the flow of fluid will be reëstablished. Means are thus provided for putting any desired limit on the action of the device.

It will be noted that the measuring mechanism, whether of the recording type as herein shown or simply of the indicating type, and the controlling mechanisms are united in a single instrument and operated by a single responsive mechanism 17. Furthermore, the adjustment of the parts is simple and most easily understood, as it may be effected by such means as the pointer 69 coöperating with the measuring scale itself.

I have described in considerable detail the particular embodiment of my invention shown in the accompanying drawings in order that the construction and operation thereof might be readily understood. I have done so, however, with a descriptive rather than a definitive intent, as it is obvious that the details of construction shown might be widely varied without departing from the spirit of my invention.

What I do claim and desire to secure by Letters Patent is:—

1. In combination, a responsive device, a valve member movable thereby comprising a flat spring and a coöperating member having a port therein over which said spring slides.

2. In combination, a responsive device, a shaft actuated thereby, a crank arm on said shaft having a flat spring extending laterally therefrom forming a valve and a coöperating member having a port therein over which said spring slides.

3. In combination, a responsive device, a shaft actuated thereby, a crank arm on said shaft having a lateral extension forming a valve, an element pivoted co-axially with said shaft and a member carried thereby having a port over which said extension is adapted to slide.

4. In combination, a valve for controlling the passage of fluid through a conduit, pressure-fluid operated moving means therefor, means to control said means including a swingable arm, a ported member carried thereby, a flexible tube between said member and said means, a responsive device, an arm movable thereby substantially co-axially with said swingable arm and adapted to coöperate with said ported member to close and open the port therein.

5. In combination, a valve for controlling the passage of fluid through a conduit, pressure-fluid operated moving means therefor, a responsive member, a shaft rotatable thereby, an index carried by the shaft, means to control said moving means including an element rotatable about the shaft, a ported member carried thereby, a pointer rotatable with said element and adapted to coöperate with the same dial as the index referred to, a flexible tube between said member and said means and an arm on the shaft adapted to coöperate with said member to close and open the port therein.

In testimony whereof, I have signed my name to this specification.

EDGAR H. BRISTOL.